(12) United States Patent
Zou et al.

(10) Patent No.: US 8,266,078 B2
(45) Date of Patent: Sep. 11, 2012

(54) PLATFORM FOR LEARNING BASED RECOGNITION RESEARCH

(75) Inventors: Yu Zou, Beijing (CN); Hao Wei, Beijing (CN); Gong Cheng, Beijing (CN); Dongmei Zhang, Redmond, WA (US); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 835 days.

(21) Appl. No.: 12/366,655

(22) Filed: Feb. 6, 2009

(65) Prior Publication Data

US 2010/0205120 A1 Aug. 12, 2010

(51) Int. Cl.
*G06F 15/18* (2006.01)
*G06K 9/62* (2006.01)
*G06K 9/46* (2006.01)

(52) U.S. Cl. .................................................... 706/12

(58) Field of Classification Search ............... 706/12; 382/181, 186
See application file for complete search history.

(56) References Cited

U.S. PATENT DOCUMENTS

| | | | |
|---|---|---|---|
| 5,454,046 A | 9/1995 | Carman, II | |
| 5,680,480 A | 10/1997 | Beernink et al. | |
| 6,393,395 B1 | 5/2002 | Guha et al. | |
| 7,379,596 B2 | 5/2008 | Haluptzok et al. | |
| 2004/0234128 A1* | 11/2004 | Thiesson et al. | 382/186 |
| 2005/0171783 A1 | 8/2005 | Suominen | |
| 2006/0149549 A1* | 7/2006 | Napper | 704/257 |
| 2007/0154094 A1 | 7/2007 | Lin et al. | |
| 2009/0003703 A1* | 1/2009 | Zhang et al. | 382/181 |

OTHER PUBLICATIONS

Jaeger, et al., " Online Handwriting Recognition: The NPen++ Recognizer ", retrieved at <<http://handwritten.net/mv/papers/jaeger01online-handwriting-recgnition-the-npen-recognizer.pdf>>, IJDAR, Oct. 9, 2000, pp. 169-180.
Lenaghan, et al., "XPEN: An XML Based Format for Distributed Online Handwriting Recognition ", retrieved at <<http://ncg.king.ac.uk/research/publications/2003/ICDAR2003/xpen_apl_ICDAR2003.pdf>>, ICDAR, Seventh International Conference on Document Analysis and Recognition, Aug. 3-6, 2003, pp. 6.
Nakagawa, et al., "Handwriting-Based User Interfaces Employing On-Line Handwriting Recognition ", retrieved at <<http://lab.bmoon.jp/papers/nakagawa9808a.pdf>>, pp. 587-596.
Bhaskarabhatla, et al., "An XML Representation for Annotated Handwriting Datasets for Online Handwriting Recognition ", retrieved at <<http://www.sdjt.si/bib/lrec04/pdf/26.pdf>>, pp. 219-222.
"Lipi Toolkit", retrieved at <<http://www.hpl.hp.com/india/lipitk>>, HP Labs India, Jul. 23, 2008, p. 1.
"Ocropus", retrieved at <<http://code.google.com/p/ocropus/>>, Sep. 17, 2008, p. 1.

* cited by examiner

*Primary Examiner* — David R Vincent
*Assistant Examiner* — Ola Olude Afolabi
(74) *Attorney, Agent, or Firm* — Lyon & Harr, LLP; Mark A. Watson

(57) ABSTRACT

A method for researching and developing a recognition model in a computing environment, including gathering one or more data samples from one or more users in the computing environment into a training data set used for creating the recognition model, receiving one or more training parameters defining a feature extraction algorithm configured to analyze one or more features of the training data set, a classifier algorithm configured to associate the features to a template set, a selection of a subset of the training data set, a type of the data samples, or combinations thereof, creating the recognition model based on the training parameters, and evaluating the recognition model.

17 Claims, 4 Drawing Sheets

PLATFORM FOR LEARNING BASED RECOGNITION RESEARCH

BACKGROUND

Researchers use pattern recognition technology to identify templates that may be represented by data samples such as letters from an alphabet, words from a specific language, faces from a group of people, fingerprints from a database, and the like. Certain pattern recognition technology may create or train a recognition model to determine the template of a given data sample. Training robust recognition models, however, may require large amounts of data samples to achieve a high recognition accuracy rate in identifying patterns. Typically, a recognition model may increase in accuracy as more high-quality data samples are provided in training the model. Researchers from different organizations, however, currently collect their own data samples and may not have the ability to share their data samples with each other which may limit the overall accuracy of their recognition models. Furthermore, since each researcher provides his own recognition algorithms and uses his own data samples, comparing recognition models against one another may be infeasible due to lack of commonly shared data sets.

Most recognition algorithms may be computationally complex and intensive. Therefore, when trained on a large data set, the computations may take up to several weeks to conduct a single training experiment on a single machine. As a result, the overall computation process for training a recognition model may be very expensive and time consuming.

SUMMARY

Described herein are implementations of various techniques for creating and evaluating pattern recognition models in a computing environment. In one implementation, a computer application may provide a web-based open research platform for one or more users on the environment to create and evaluate recognition models. The computer application may provide a uniform workflow in building the recognition model such that any user may build a new recognition model within the platform. Through computer application, the new recognition model may be created using the computational resources of one or more backend Central Processing Unit (CPU) resources in communication with the computer application. In one implementation, the computer application may be stored on a server that may be connected to one or more computing systems capable of creating and evaluating recognition models.

In one implementation, the computer application may use four modules to create and evaluate recognition models. The modules may include a data module, a training module, an evaluation module, and a plug-in module.

The data module may be used to collect one or more data samples for one or more templates. These data samples may then be used to create a recognition model for identifying future data samples that may correspond to a specific template. In one implementation, the data samples may include characters written and entered into the computing system 100 by a user using a tablet PC, a writing pad, or any other similar device. The data sample may include the image of the character written by the user along with information pertaining to how the character was written. For instance, if a user writes the letter "i" using a stylus on the tablet PC, the user's writing sample of the letter "i" may be considered to be the data sample. The data sample may include information pertaining to the motion or stroke in which the user moved the stylus on the tablet PC to write the letter "i" along with the image of the sample. The template may define what a data sample may represent. A collection of templates may be defined as a template set. For instance, if the template set in the data module is English alphabet, then the collected samples in the data module should be written instances of English letters, and each English letter is a template. Similarly, if the template set is Arabic numbers (0 to 9), then the collected data samples may be written instances of Arabic numbers 0 to 9, and each Arabic number may be considered to be a template.

In one implementation, the data module may receive data samples from one or more users in the environment. The data module may then allow one or more users to browse through all of the data samples that may have been collected from all the users on the environment. The users may define a training set or a testing set of data samples from the data samples that may be available on the data module. In one implementation, the training set of data samples may be used to create a recognition model in the training module, and the testing set of data samples may be used to evaluate a recognition model in the evaluation module.

The training module may develop a recognition model that may be used to identify what each data sample may represent. In one implementation, the training module may provide a uniform end-to-end workflow for training or creating a recognition model for any user on the environment. In one implementation, the workflow may include five steps: feature extraction, feature analysis, feature selection, classifier training and evaluation. In one implementation, the uniform workflow in the training module may provide a user an infrastructure to create recognition models so that he may not need to repeat the same workflow himself. Furthermore, creating a recognition model may be computationally expensive because the computing cost increases as the number of data samples used in creating a recognition model increases. Therefore, the computer application may create the recognition model using the computational resources of one or more backend Central Processing Unit (CPU) resources in order to conduct efficient training on a large amount data samples. The CPU resources may perform all of the recognition model training in parallel manner using one or more computing systems that may be part of the CPU resources.

The evaluation module may provide the user with the ability to evaluate a recognition model with a separate data sample set from which the training module used to create the recognition model. In one implementation, a user may evaluate any recognition model that may be available to the computer application. In addition to evaluating any available recognition model, a user may evaluate a recognition model with a set of data samples that he may have been defined by himself or any other user on the environment. After the evaluation module evaluates the recognition model, it may provide statistics and performance results of the recognition along with the statistics and performance results of other recognition models previously created or evaluated by the computer application The plug-in module may be used to upload a new algorithm to the research platform application 60. The new algorithm may be used by the training module to create a recognition model. After the recognition model is created with the new algorithm, the recognition model may be evaluated along with other recognition models available in the research platform application 60.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

In general, one or more implementations described herein are directed to creating and evaluating recognition models in a computing environment. One or more implementations of various techniques for creating and evaluating recognition models in a computing environment will now be described in more detail with reference to FIGS. 1-4 in the following paragraphs.

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. The various technologies described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

Figure 1:
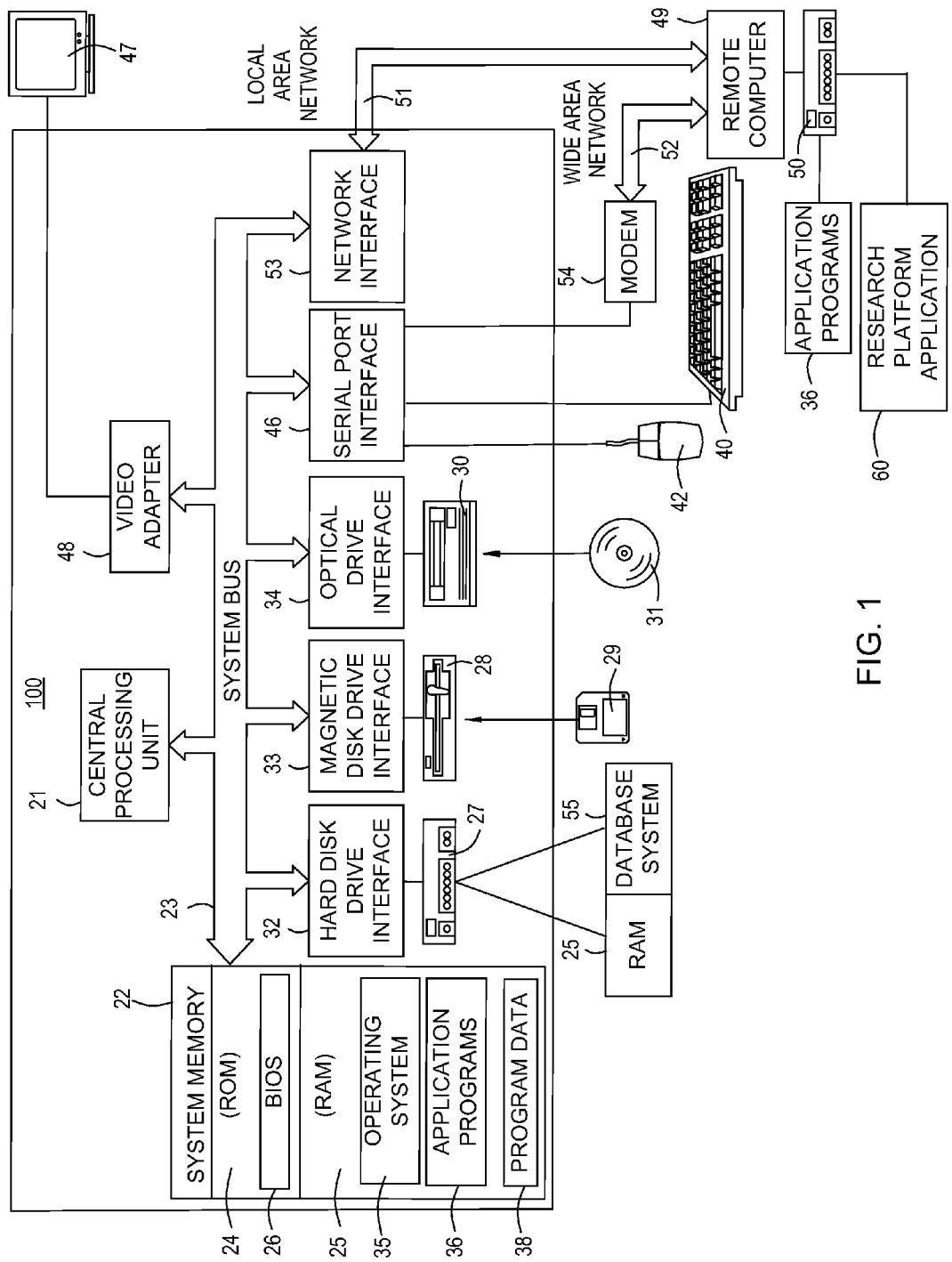
FIG. 1 illustrates a schematic diagram of a computing system in which the various techniques described herein may be incorporated and practiced.

FIG. 1 illustrates a schematic diagram of a computing system 100 in which the various technologies described herein may be incorporated and practiced. Although the computing system 100 may be a conventional desktop or a server computer, as described above, other computer system configurations may be used.

The computing system 100 may include a central processing unit (CPU) 21, a system memory 22 and a system bus 23 that couples various system components including the system memory 22 to the CPU 21. Although only one CPU is illustrated in FIG. 1, it should be understood that in some implementations the computing system 100 may include more than one CPU. The system bus 23 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 22 may include a read only memory (ROM) 24 and a random access memory (RAM) 25. A basic input/output system (BIOS) 26, containing the basic routines that help transfer information between elements within the computing system 100, such as during start-up, may be stored in the ROM 24.

The computing system 100 may further include a hard disk drive 27 for reading from and writing to a hard disk, a magnetic disk drive 28 for reading from and writing to a removable magnetic disk 29, and an optical disk drive 30 for reading from and writing to a removable optical disk 31, such as a CD ROM or other optical media. The hard disk drive 27, the magnetic disk drive 28, and the optical disk drive 30 may be connected to the system bus 23 by a hard disk drive interface 32, a magnetic disk drive interface 33, and an optical drive interface 34, respectively. The drives and their associated computer-readable media may provide nonvolatile storage of computer-readable instructions, data structures, program modules and other data for the computing system 100.

Although the computing system 100 is described herein as having a hard disk, a removable magnetic disk 29 and a removable optical disk 31, it should be appreciated by those skilled in the art that the computing system 100 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 100. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

A number of program modules may be stored on the hard disk 27, magnetic disk 29, optical disk 31, ROM 24 or RAM 25, including an operating system 35, one or more application programs 36, program data 38, and a database system 55. The operating system 35 may be any suitable operating system that may control the operation of a networked personal or server computer, such as Windows® XP, Mac OS® X, Unix-variants (e.g., Linux® and BSD®), and the like.

A user may enter commands and information into the computing system 100 through input devices such as a keyboard 40 and pointing device 42. Other input devices may include a microphone, joystick, game pad, satellite dish, scanner, or the like. These and other input devices may be connected to the CPU 21 through a serial port interface 46 coupled to system bus 23, but may be connected by other interfaces, such as a parallel port, game port or a universal serial bus (USB). A monitor 47 or other type of display device may also be connected to system bus 23 via an interface, such as a video adapter 48. In addition to the monitor 47, the computing system 100 may further include other peripheral output devices such as speakers and printers.

Further, the computing system 100 may operate in a networked environment using logical connections to one or more remote computers The logical connections may be any connection that is commonplace in offices, enterprise-wide computer networks, intranets, and the Internet, such as local area network (LAN) 51 and a wide area network (WAN) 52.

When using a LAN networking environment, the computing system 100 may be connected to the local network 51 through a network interface or adapter 53. When used in a WAN networking environment, the computing system 100 may include a modem 54, wireless router or other means for establishing communication over a wide area network 52, such as the Internet. The modem 54, which may be internal or external, may be connected to the system bus 23 via the serial port interface 46. In a networked environment, program modules depicted relative to the computing system 100, or portions thereof, may be stored in a remote memory storage device 50 of a remote computer 49. The remote computer 49 may include similar properties as those indicated in the computing system 100. It will be appreciated that the network connections shown are exemplary and other means of establishing a communications link between the computers may be used.

In one implementation, the remote memory storage device 50 may include the research platform application 60. The research platform application 60 may be an open web-based application that may be utilized by one or more users to collect data, create recognition models, or evaluate recognition models. In one implementation, the research recognition application 60 may include four modules: data, training, evaluation, and plug-in. Each module of the research platform application 60 may perform a different function in creating and evaluating recognition models. In one implementation, the modules may be represented on the user interface of the research platform application 60 as tabs, where each tab may pertain to a different module. The research platform application 60 and its modules may be described in more detail in FIG. 3.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Figure 2:
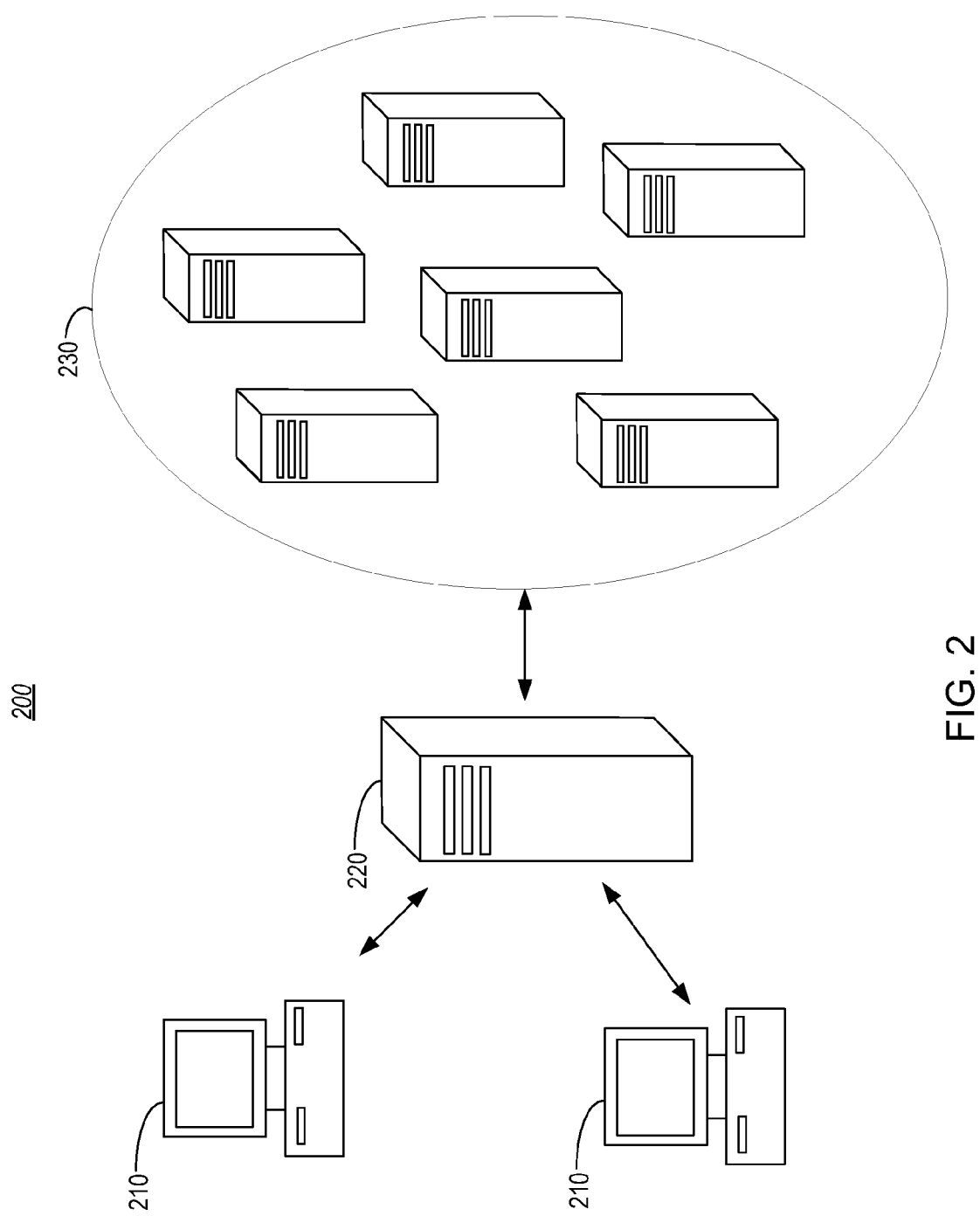
FIG. 2 illustrates a schematic diagram of a system for creating and evaluating recognition models in a computing environment in accordance with one or more implementations of various techniques described herein.

FIG. 2 illustrates a schematic diagram of a system 200 for creating and evaluating recognition models in a computing environment in accordance with one or more implementations of various techniques described herein. The following description of system 200 is made with reference to computing system 100 of FIG. 1 in accordance with one or more implementations of various techniques described herein. In one implementation, the system 200 may include two or more end users' PCs 210, a server 220, and a computer cluster 230.

In one implementation, the end users' PCs 210 may be configured like the computing system 100 described in FIG. 1. The server 220 may be connected to each end user's PC 210 through the LAN 51 or the WAN 52. The server 220 may correspond to the remote computer 49 in the computing system 100 and may include the research platform application 60. The server 220 may provide an interface between the end users' PCs 210 and the computer cluster 230 through the research platform application 60. The server 220 may also communicate with the computer cluster 230 to search for data samples, search for other recognition models, submit a request to train a recognition model, submit a request to evaluate a recognition model, search the evaluation data, or the like.

The computer cluster 230 may include one or more computing systems 100 that may be capable of storing data and applications that may be used by the research platform application 60. The computer cluster 230 may provide large scale data storage and computational capabilities for the research platform application 60. In one implementation, each computing system 100 in the computer cluster 230 may communicate with each other through a network protocol to save data or perform one or more analysis for the research platform application 60. In one implementation, the research platform application 60 may include one or more training applications that may analyze and interpret data that may be stored in the computer cluster 230. Two or more computing systems 100 of the computer cluster 230 may execute the training applications in parallel to efficiently interpret the provided data. In one implementation, the computer cluster 230 may store data, recognition models, evaluations of the recognition models, and the like, in its system memory 22 or hard drive 27.

Figure 3:
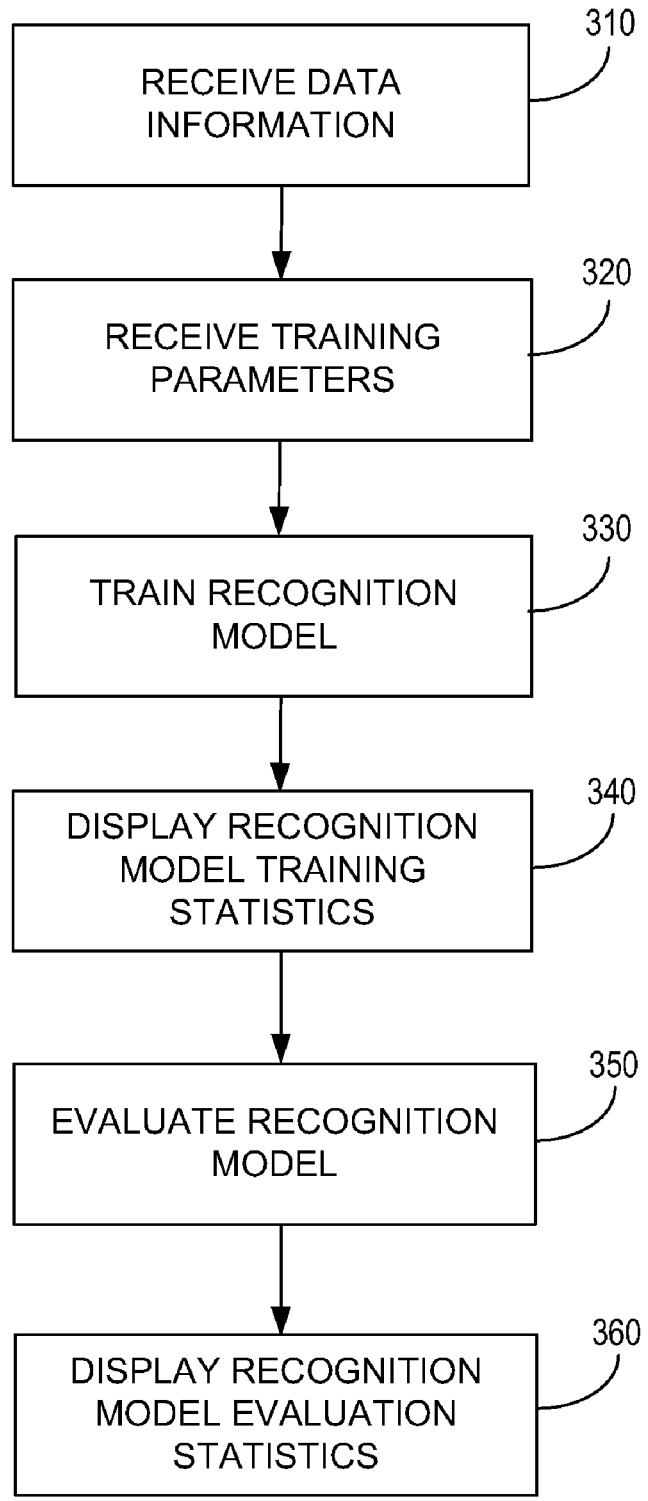
FIG. 3 illustrates a flow diagram of a method for creating and evaluating recognition models in a computing environment in accordance with one or more implementations of various techniques described herein.

FIG. 3 illustrates a flow diagram of a method 300 for creating and evaluating recognition models in a computing environment in accordance with one or more implementations of various techniques described herein. The following description of method 300 is made with reference to system 200 of FIG. 2 in accordance with one or more implementations of various techniques described herein. Additionally, it should be understood that while the operational flow diagram indicates a particular order of execution of the operations, in some implementations, certain portions of the operations might be executed in a different order. In one implementation, the method 300 for creating and evaluating recognition models in a computing environment may be performed by the research platform application 60.

At step 310, the research platform application 60 may receive data information from one or more users in the computing environment. In one implementation, the computing environment may include one or more users that may be connected to the research platform application 60 via the Internet, Intranet, LAN 51, WAN 52, or any other similar methods. In one implementation, the data may be received in the data module of the research platform application 60. Here, the one or more users on the computing environment may provide data samples to the research platform application 60 by uploading the data samples to the server 220.

In one implementation, if the research platform application 60 may be designed to recognize handwritten letters in the English alphabet, users on the computing environment may upload samples of one or more letters to the research platform application 60. The user may upload the data sample using a tablet PC, writing pad, or any other similar device. The data sample may be stored as an "ink" file in the computer cluster 230. Although the data samples have been described to include letters of the English alphabet, it should be understood that in some implementations the data samples may include, but are not limited to symbol data, number data, speech data, human face data, fingerprint data, and other similar types of data. The "ink" file may store an image of the data sample along with other data describing the data sample such as the writer's writing strokes as obtained from the tablet PC or other similar data. Although the research platform application 60 may have been used in letter recognition, it should be noted that in other implementations the research platform application 60 may be used in number recognition, speech recognition, symbol recognition, facial recognition, fingerprint recognition, and the like.

In one implementation, a user may use the research platform application 60 to browse the data samples stored in the computer cluster 230. Since the research platform application 60 may be accessed by multiple users on the computing environment, the data supplied by each user on the computing environment may be viewed by any other user on the environment as well. This feature may allow users (e.g. researchers) to access many more data samples without having to obtain all of the samples themselves.

In yet another implementation, a user may use the data module of the research platform application 60 to define a subset or portion of data samples from all of the data samples stored on the computer cluster 230 to use for the training module in subsequent steps of the method 300. In one implementation, the set of data samples may be used as a training data set for the training module described at step 330.

At step 320, the research platform application 60 may receive one or more training parameters from a user to create a recognition model. In one implementation, the training parameters may be received in the training module of the research platform application 60. Each of the training parameters may be displayed to the user, and the research platform application 60 may receive a selection of one or more training parameters to use for creating the recognition model. The training parameters may define a template, a data sample set, a feature extraction algorithm, a classifier algorithm, and other similar items that may be used in training the recognition model. In one implementation, each training parameter may be accessible and customizable to any user in the computing environment.

The feature extraction algorithm may be used to obtain one or more features of a data sample, and the classifier algorithm may determine what template the data sample may represent using the features of the data sample. The template may define the type of data sample of the data sample set. For instance, templates may include characters in different languages, mathematical symbols, fingerprints, human faces, and the like. A template may represent the meaning of a data sample. For example, the English alphabet contains 26 letters, and each letter may be a template while the English alphabet, as a whole, is a template set. A user's actual writing sample of a template may be the data sample in accordance with one or more implementations on various techniques described herein.

The data sample set may include the data samples selected by the user at step 310. Each of the training parameters may be used by the training module to create the recognition model. In one implementation, the research platform application 60 may provide default algorithms for the feature extraction algorithm or the classifier algorithm so that the user may build a recognition model even if he knows only a few details about the algorithm.

In one implementation, a user may upload a feature extraction algorithm or a classifier algorithm to be used as a training parameter. The algorithms may be uploaded in the plug-in module of the research platform application 60. The plug-in module may provide users an opportunity to do experiments with their own algorithms and compare the results of the recognition algorithms with the results of other users on the computing environment.

At step 330, the research platform application 60 may create the recognition model using the training parameters received at step 320. In one implementation, the recognition model may be created using a general workflow process. In one implementation, the workflow process may include five steps including: feature extraction, feature analysis, feature reduction, classifier training, and recognition evaluation. Due to the amount of computational power used to create the recognition model, the research platform application 60 may send the training parameters to the computing systems of the computer cluster 230 to create the recognition model. In one implementation, the computing systems of the computer cluster 230, alone or in combination, may perform the workflow process steps. These five steps are also described in more detail with reference to FIG. 4 in the paragraphs below.

In one implementation, the feature extraction step may transform each data sample in the data set selected at step 310 into a set of feature vectors that represents the characteristics of the data sample. The feature vectors may have one or more dimensions (n). The feature analysis step may then use the n-dimensional feature vectors of data samples in the training data set to produce a feature selection matrix M. In one implementation, the feature analysis step may be performed using a Linear Discriminant Analysis (LDA). Next, at the feature reduction step, smaller m-dimensional feature vectors may be generated based on the original n-dimensional feature vectors and the feature selection matrix M. The classifier training step then creates a recognition model using the classifier algorithm received at step 320.

After completing the workflow process, the research platform application 60 may store the newly trained recognition model in the computer cluster 230 so that it may be accessible by any user using the research platform application 60. In one implementation, a user may download the recognition model from the computer cluster 230 using the research platform application 60 to perform evaluations or use it in recognition tasks on a local machine.

While the research platform application 60 may labor through each of the workflow process steps, the progress of the training of the recognition model may be displayed on the user interface of the research platform application 60. In one implementation, the progress may be indicated by displaying a total completion percentage. The workflow process may be applicable to many statistical recognition algorithms such as the nearest neighboring classifier, Gaussian classifier, and the like. Although one set of steps has been described for the workflow process, it should be understood that the research platform application 60 may support a variety of workflow processes.

In one implementation, the training of the recognition model may be created in one or more iterations until the recognition accuracy meets a predetermined threshold. For example, the parameters of a classifier model may continuously be adjusted until the model identifies any data sample in the training set accurately 90% of the time on its first attempt. In one implementation, the classifier model may be used to classify data samples to its respective template. The parameters of the classifier model may continuously be adjusted until the difference between the accuracy rates of two subsequent rounds/iterations of training is smaller than a predetermined percentage. For example, if the accuracy rate of the recognition model for one training iteration is 92.2%, the accuracy rate of the next training iteration is 92.4%, and the predetermined difference percentage is 0.1%, the research platform application 60 may continue training the recognition model until the difference between two subsequent training iterations is equal to or less that 0.1%.

At step 340, the research platform application 60 may display statistics pertaining to the accuracy of the recognition model during its training. In one implementation, the training statistics may include the total number of samples used to train the recognition model. The research platform application 60 may also display one or more accuracy statistics for the training of the recognition model. For instance, the accuracy statistics may include the percentage in which the recognition model accurately identified a character after its first attempt during the training process. The accuracy results may also display the percentage in which the recognition model accurately identified the character after its second, third, fourth, (etc.) attempts during the training process. Further, the recognition platform application 60 may also display statistics describing the data sample with the worst accuracy after the first attempt and the data sample with the worst accuracy after the first ten attempts. Although the research platform application 60 has been described to display accuracy statistics, it should be understood that in other implementations additional statistics may also be displayed.

At step 350, the research platform application 60 may evaluate the recognition model created at step 330. In one implementation, the evaluation of the recognition model may take place in the evaluation module of the research platform application 60. In order to evaluate a recognition model, the research platform application 60 may receive inputs from a user, such as the recognition model to be evaluated, a subset of an evaluation dataset to use for testing or evaluating the recognition model. In one implementation, the recognition model, the subset of the evaluation dataset, and the training parameters may be uploaded to the research platform application 60 and may be accessible and customizable to any user on the computing environment. The evaluation dataset may include one or more data samples that may be part of a group of datasets that are distinct from the data sample set described in step 310. In one implementation, the user may select a subset of the evaluation dataset to be used for evaluating the recognition model.

The research platform application 60 may proceed through a similar workflow process as detailed in step 330 in order to evaluate the recognition model, except with the testing dataset defined at step 350 and without training the recognition model. In one implementation, the research platform application 60 may only use one attempt in trying to identify the data sample in the evaluation module in order to test the recognition model's accuracy in identifying characters.

At step 360, the research platform application 60 may display statistics pertaining to the evaluation of the recognition model. In one implementation, the evaluation statistics may include the same statistics as described in step 340.

Figure 4:
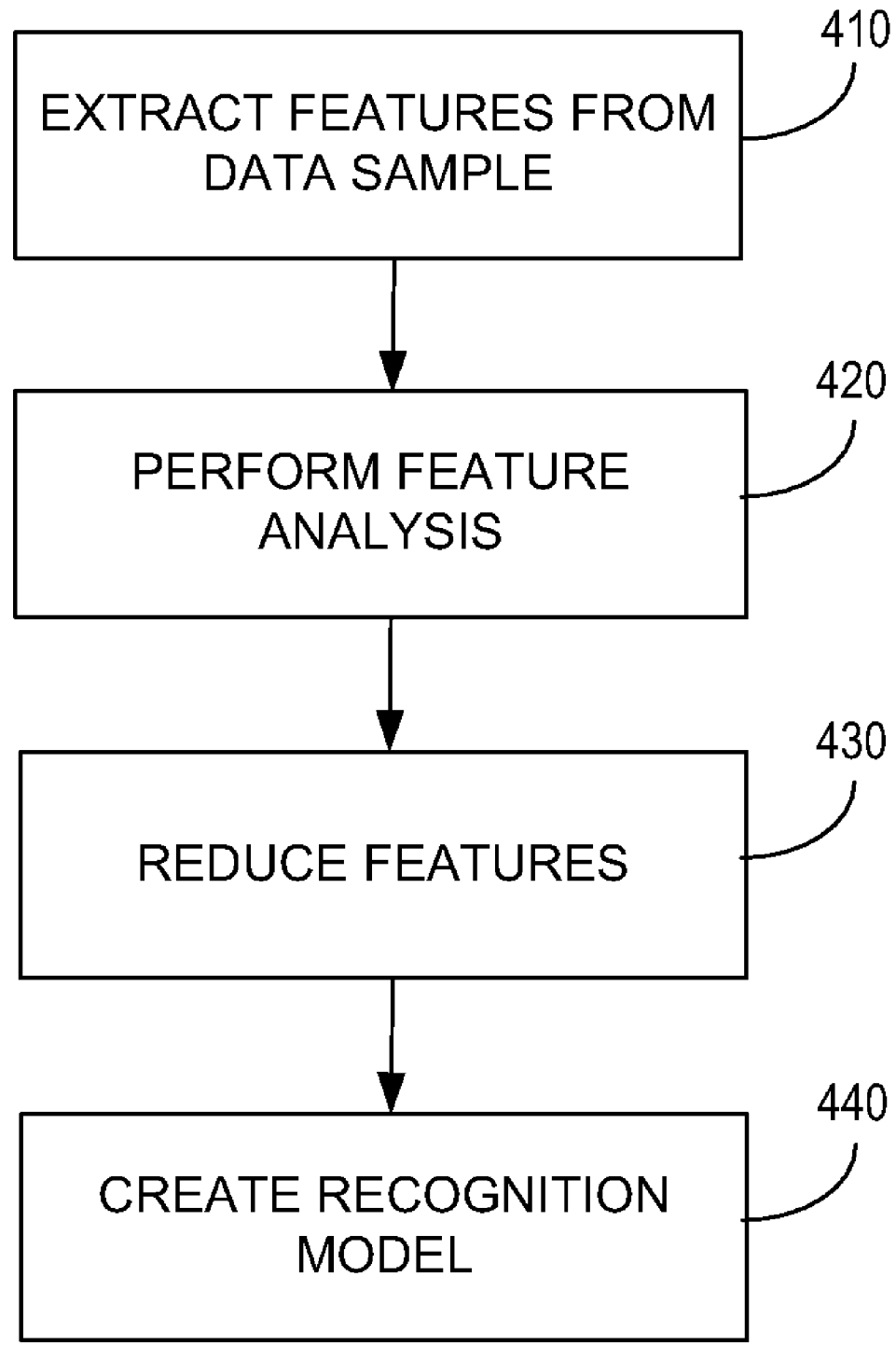
FIG. 4 illustrates a flow diagram of a workflow for creating a recognition model in a computing environment in accordance with one or more implementations of various techniques described herein.

FIG. 4 illustrates a flow diagram of a workflow 400 for creating a recognition model in a computing environment in accordance with one or more implementations of various techniques described herein. The following description of workflow 400 is made with reference to computing system 100 of FIG. 1 in accordance with one or more implementations of various techniques described herein. The following description of workflow 400 is also made with reference to the method 300 of FIG. 3 in accordance with one or more implementations of various techniques described herein. Additionally, it should be understood that while the operational flow diagram indicates a particular order of execution of the operations, in some implementations, certain portions of the operations might be executed in a different order. In one implementation, the workflow 400 for creating a recognition model in a computing environment may be performed by the research platform application 60.

At step 410, the research platform application 60 may extract features from a data sample. In one implementation, the research platform application 60 may transform each data sample into a set of feature vectors that represents the characteristics of the data sample. The feature vectors may use one or more dimensions (n) to represent the data sample.

At step 420, in one implementation, the research platform application 60 may perform a feature analysis on the feature vectors obtained at step 410. In one implementation, the feature analysis may use a Linear Discriminant Analysis to produce a feature selection matrix M from the n-dimensional feature vectors of a data sample.

At step 430, the research platform application 60 may reduce the features obtained from the data sample. In one implementation, the n-dimensional feature vectors obtained from step 410 may be reduced to smaller m-dimensional feature vectors based on the feature selection matrix M obtained from step 420.

At step 440, the research platform application 60 may create a recognition model via training a classifier model. In one implementation, the parameters of the classifier model may continuously be adjusted until the model identifies any data sample in the training set accurately at a predefined accuracy threshold of the time on its first attempt. The recognition model may then be capable of identifying the meaning or content of a data sample.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for researching and developing a recognition model in a computing environment, comprising:
providing a user interface whereby each of a plurality of users in the computing environment creates one or more training data sets by specifying each data sample in each training data set created by each user;

receiving a set of training parameters via the user interface for use in constructing a recognition model;
wherein receiving the training parameters comprises:
selecting one or more feature extraction algorithms from a display of a plurality of feature extraction algorithms that were previously uploaded by the users, each feature extraction algorithm configured to extract one or more features from data samples,
selecting one or more classifier algorithms from a display of a plurality of classifier algorithms that were previously uploaded by the users, each classifier algorithm configured to associate extracted features to a template set, and
selecting one or more of the training data sets from a display of the previously created training data sets;
creating the recognition model based on the training parameters by combining the selected feature extraction algorithms, the selected classifier algorithms, and the selected training data sets; and
evaluating the recognition model to determine an accuracy of the recognition model.

2. The method of claim 1, wherein each data sample comprises an ink file having an image and data representing a data sample based on a user selected data sample type.

3. The method of claim 1, wherein the data samples of the training data set are browseable by the users.

4. The method of claim 1, wherein a user selected data sample type is configured for any of word recognition, symbol recognition, facial recognition, fingerprint recognition, and speech recognition.

5. The method of claim 1, wherein creating the recognition model comprises:
transforming each data sample of the subset of the training data set into n-dimensional feature vectors using the feature extraction algorithm:
performing a feature analysis to find a feature selection matrix M based on the feature vectors;
reducing the n-dimensional feature vectors into m-dimensional feature vectors based on the feature selection matrix M, wherein m is less than n; and
training the recognition model using the m-dimensional feature vectors based on the classifier algorithm in an iterative manner.

6. The method of claim 5, wherein the recognition model is created in a uniform manner.

7. The method of claim 5, wherein creating the recognition model further comprises displaying statistics pertaining to an accuracy of the recognition model in identifying each data sample of the subset of the training data set.

8. The method of claim 7, wherein the statistics comprise:
a total number of the data samples used in creating the recognition model; and
one or more percentages in which the recognition model accurately identified the data samples of the subset of the training data set on one or more iterations of training.

9. The method of claim 7, wherein the statistics comprise:
a total number of the data samples used in creating the recognition model;
a first percentage in which the recognition model accurately identified a first data sample of the subset of the training data set on a first iteration of training; and
a second percentage in which the recognition model accurately identified the first data sample of the subset of the training data set on a second iteration of training.

10. The method of claim 9, further comprising:
comparing the first percentage with a predetermined threshold; and
stopping the training of the recognition model if the first percentage is greater than the predetermined threshold.

11. The method of claim 9, further comprising:
determining a difference between the first percentage and the second percentage; and
stopping the training of the recognition model if the difference is smaller than a predetermined threshold.

12. The method of claim 9, wherein the first percentage and the second percentage correspond to any two consecutive percentages in which the recognition model accurately identified the first data sample in any two consecutive iterations for the any two consecutive percentages.

13. The method of claim 1, wherein evaluating the recognition model comprises:
gathering an evaluation data set of the data samples from the users in the computing environment;
displaying one or more subsets of the evaluation data set, wherein the subsets of the evaluation data set are previously defined by the users;
receiving a selection of a subset of the evaluation data set, wherein the evaluation data set is distinct from the training data set;
identifying the subset of the evaluation data set using the recognition model; and
displaying one or more statistics pertaining to an accuracy of the recognition model in identifying each data sample of the subset of the evaluation data set.

14. A computing environment, comprising using one or more computers to perform process actions to:
gather one or more data samples from each of a plurality of users in the computing environment via a user interface into a plurality of training data sets used for creating a recognition model;
store the training data sets in the cluster of computers;
receive a selection of training parameters via the user interface for use in constructing the recognition model by:
selecting one or more feature extraction algorithms from a display of a plurality of feature extraction algorithms, each feature extraction algorithm configured to extract one or more features from data samples,
selecting one or more classifier algorithms from a display of a plurality of classifier algorithms, each classifier algorithm configured to associate extracted features to a template set, and
selecting one or more of the training data sets from a display of the plurality of training data sets;
create the recognition model based on the selection of training parameters; and
evaluate the recognition model to determine an accuracy of the recognition model.

15. The computing environment of claim 14, further comprising using one or more of the computers to perform process actions to:
transform each data sample of the subset of the training data set into n-dimensional feature vectors using the feature extraction algorithm;
perform a feature analysis to find a feature selection matrix M based on the feature vectors;
reduce the n-dimensional feature vectors into m-dimensional feature vectors using the feature selection matrix M, wherein m is less than n; and
train the recognition model using the m-dimensional feature vectors based on the classifier algorithm.

16. The computing environment of claim 15, further comprising using one or more of the computers to perform process actions to determine an accuracy of the recognition model in identifying each data sample of the subset of the training data set.

17. A method for researching and developing a recognition model in a computing environment, comprising:
providing a user interface for displaying a plurality of subsets of a training data set, each subset having one or more data samples, the subsets having been previously defined by one or more users in the computing environment;
selecting one or more of the subsets via the user interface;
selecting one or more feature extraction algorithms that were previously uploaded by the users from a plurality of feature extraction algorithms displayed via the user interface, each feature extraction algorithm being configured to extract one or more features from each data sample of the selected subsets;
selecting one or more classifier algorithms that were previously uploaded by the users from a plurality of classifier algorithms displayed via the user interface, the classifier algorithms being configured to associate the features to a template set;
creating the recognition model from the selected feature extraction algorithms, the selected classifier algorithms, and the selected subsets; and
evaluating the recognition model to determine an accuracy of the recognition model.

* * * * *